Sept. 6, 1955 F. A. HESTER 2,717,191
SINUSOIDAL RECORDER
Filed May 20, 1952 2 Sheets-Sheet 1

INVENTOR.
FRANK A. HESTER
BY
J. B. Burke
ATTORNEY

Sept. 6, 1955 F. A. HESTER 2,717,191
SINUSOIDAL RECORDER
Filed May 20, 1952 2 Sheets-Sheet 2

INVENTOR.
FRANK A. HESTER
BY J. B. Burke
ATTORNEY

United States Patent Office 2,717,191
Patented Sept. 6, 1955

---

2,717,191

SINUSOIDAL RECORDER

Frank A. Hester, New York, N. Y., assignor to Faximile, Inc., New York, N. Y., a corporation of Delaware Application May 20, 1952, Serial No. 288,877

7 Claims. (Cl. 346—101)

The present invention concerns recorders and particularly recorders employing rotating electrodes.

In certain recording devices where a flexibly mounted linear electrode is used in conjunction with a 360° rotating helical electrode to produce marks on recording paper disposed therebetween, the speed of recording is restricted by excessive vibration of the linear electrode due to the sawtooth nature of its contact with the rotating helix during each revolution. The same objectionable vibration occurs whether the linear electrode or the helical electrode is flexibly mounted.

In the present invention, the speed of recording may be increased by utilizing a faster rotating electrode so constructed that electrode vibration is sinusoidal with respect to time. It is proposed to provide a rotatable electrode which is elliptical in form. The point of contact between the elliptical electrode and a tangentially disposed linear electrode moves sinusoidally when the elliptical electrode is uniformly rotated. The sinusoidal vibration imparted to the flexibly mounted electrode allows much greater speed of rotation of the rotatable electrode than heretofore possible.

In certain measuring devices such as disclosed in Patent 2,587,319 to J. V. L. Hogan, a sweep balance circuit is arranged so that when the amplitude of a voltage to be recorded equals the amplitude of a balance voltage, a marking circuit causes a mark to be recorded at the point or area of intersection between a rotating helical electrode and a linear electrode. In the aforesaid patent the sweep circuit is required to generate a sawtooth or triangular voltage waveform. Such a waveform is inherently complex in nature. By use of the present invention, a sine voltage waveform may be generated by the sweep balance circuit. Such a waveform is inherently relatively simple, which simplifies the construction of the sweep balance circuit. At the same time increased speed of recording is made possible by use of the elliptical form of recording electrode. It is an important characteristic of the present invention that recording occurs linearly with respect to time when the balance voltage generated by the sweep circuit is sinusoidal. A further advantage of the present invention is that wear of the rotating electrode does not change the size of the marking area as occurs with conventional helical electrodes. The elliptical electrode is considered easier to mount for rotation and simpler to manufacture than conventional electrodes. The invention is further adaptable to plural channel recording.

It is therefore a principal object of the invention to provide a recorded employing a rotatable elliptical electrode and an associated linear electrode.

It is another object to provide a recorder in which the point of contact of a rotatable electrode with a linear electrode moves sinusoidally with respect to time when the rotatable electrode is rotated at a constant speed.

It is a further object to provide a multi-channel recorder employing rotatable elliptical electrodes.

These and other objects and advantages of the invention will become apparent from the detailed description of the invention given in connection with the various figures of the drawing, wherein.

Figure 1:
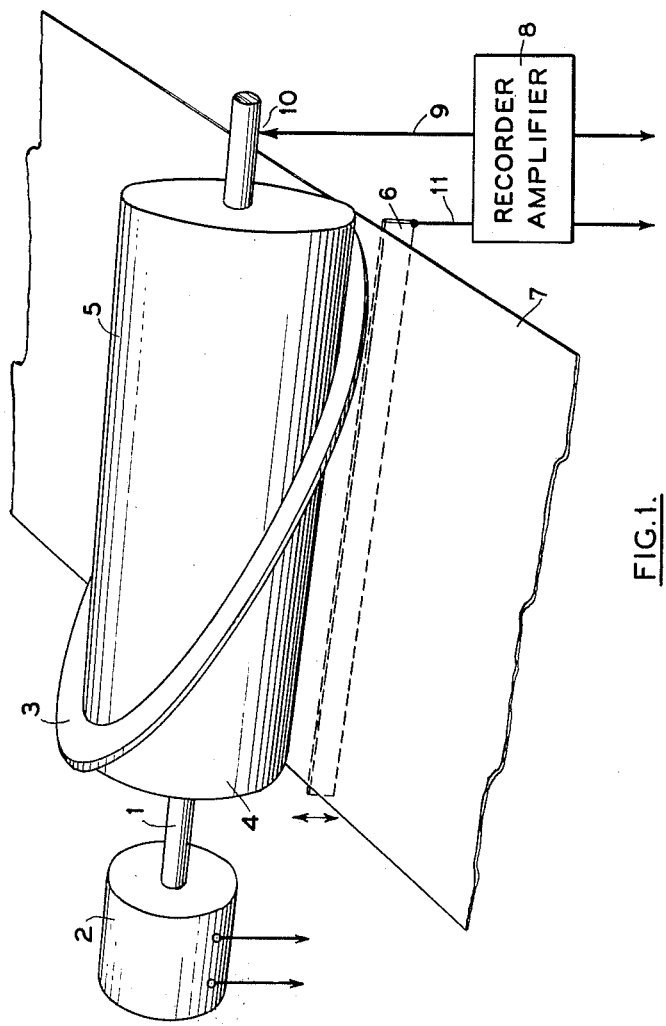
Fig. 1 is a perspective view of a recorder in accordance with the invention.

Referring to Fig. 1, electrode 3 is an elliptical disk of electrically conductive material. The geometrical shape of the disk is that of an ellipse formed by a plane intersecting a right cylinder at an acute angle to the axis of the cylinder. Electrode 3 is disposed on shaft 1 at an acute angle thereto and is both mechanically and electrically joined to shaft 1 in any suitable manner. Spacer elements 4 and 5, of insulating or conductive material support the electrode 3 rigidly on shaft 1. The spacer elements 4 and 5 together form in effect a cylindrical drum on shaft 1 with electrode 3 disposed between the oblique sections of the cylinder. The electrode 3 projects from spacers 4 and 5 a uniform distance radially with respect to shaft 1. A linear electrode 6 is disposed parallel to the shaft 1 and abuts the elliptical electrode 3 tangentially thereto with a record sheet 7 therebetween. The record sheet may be advanced between electrodes 3 and 6 by any suitable means. Motor 2 is connected to and drives shaft 1. As shaft 1 is rotated at a constant speed the point or area of contact between electrodes 3 and 6 moves back and forth sinusoidally with respect to time. At no time during rotation of the electrode 3 is contact lost between the electrodes. Any vibration imparted to either or both electrodes because of their relative movement is low in amplitude and the electrodes vibrate with smooth rather than abrupt changes in direction. As a result the electrode 3 may be rotated at a higher speed than is possible in recorders where abrupt changes in direction of movement of electrodes occurs during vibration of the electrodes.

A recorder amplifier 8 of conventional type is fed with signals to be recorded from a suitable source not shown. The output of the amplifier 8 is connected on one side by line 9 and shaft 1 to electrode 3. A wiping contact 10 is provided at the end of line 9 to insure direct electrical connection to shaft 1 during rotation. The output of amplifier 8 is connected on the other side to electrode 6 via line 11. The recording circuit is completed through the record sheet between electrodes 3 and 6. When a pulse to be recorded appears at the output of amplifier 8, the flow of current through record sheet 7 causes a mark to appear on the sheet in a manner well known in the art.

Figure 2:
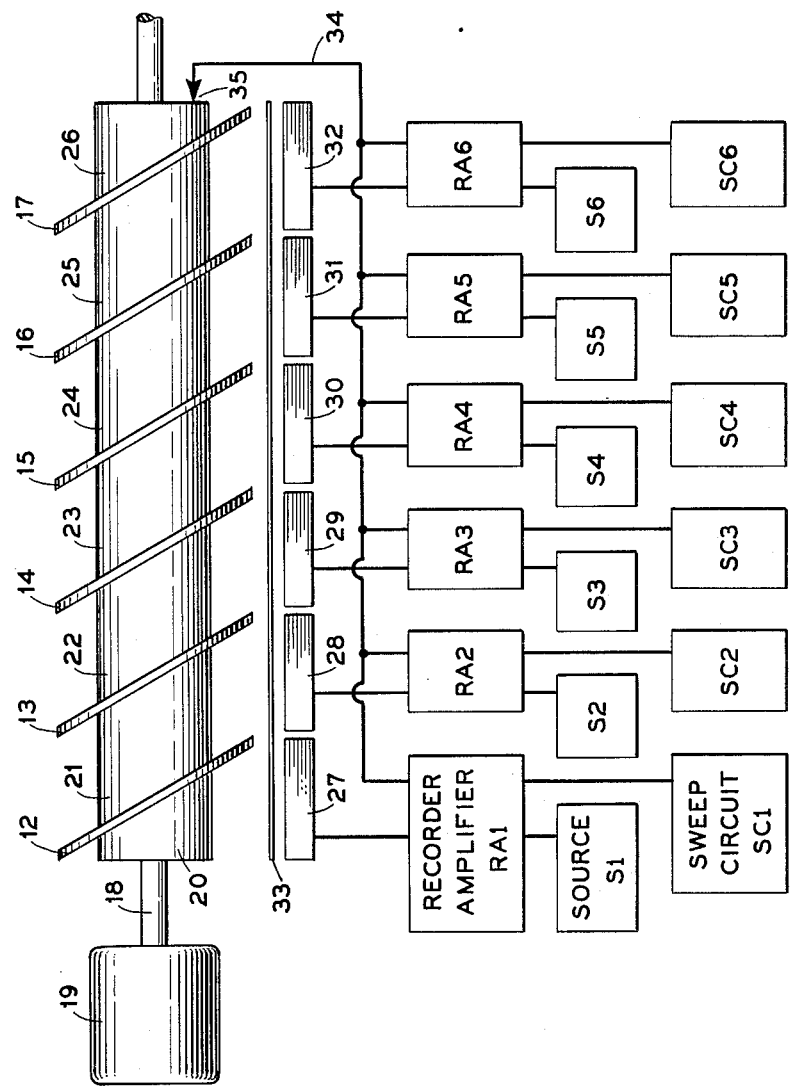
Fig. 2 is an elevational and partially diagrammatic view of a multichannel recorder in accordance with the invention.

Fig. 2 illustrates a multichannel recorder embodying the invention. A plurality of elliptical electrodes 12 to 17 inclusive corresponding to the number of desired recording channels are mounted on the shaft 18. Shaft 18 is driven by motor 19. Electrodes 12 to 17 are equally spaced apart and held in position on shaft 18 by the electrically conductive spacers 20 to 26 inclusive. Each of spacers 20 to 26 is in the form of an oblique section of a right cylinder. An individual linear electrode is provided for contacting each elliptical electrode. As shown in Fig. 2, electrodes 27 through 32 are disposed to contact electrodes 12 through 17 respectively. Recording paper 33 is drawn between the rotatable electrodes 12 to 17 and linear electrodes 27 to 32 by any suitable means. During each 360° revolution of the shaft 18 which is at a constant rate with respect to time, the point area of contact between each elliptical electrode and its associated linear electrode will travel twice laterally between two extremes and sinusoidally with respect to time.

Individual recorder amplifiers RA1 through RA6 of conventional type are connected to linearly electrodes 27 through 32 respectively and have a common return line 34. Line 34 is electrically jointed to the elliptical electrodes by wiping contact 35 on spacer 26. Sources of electrical pulses or signals to be recorded, S1 through S6 are connected to amplifiers RA1 through RA6 respectively. As the electrodes 12 through 17 rotate, pulses emitted by any or all of sources S1 through S6 are fed to the respective associated amplifier and are then recorded on recording sheet 33.

Sweep circuits SC1 through SC6 are provided for operating the apparatus as a multichannel sweep balance recorder. Each of the circuits SC1 through SC6 is a signal generator of conventional type for generating a sinusoidal reference voltage.

Each of sweep circuits SC1 through SC6 and signal sources S1 through S6 is connected to its associated amplifier RA1 through RA6 in the same manner that the sweep circuit, signal source and recorder amplifier shown in the aforesaid Patent 2,587,319 are connected together. When the amplitude of the output voltage of any signal source equals the amplitude of its balance voltage a marking signal is produced at the output of the appropriate recorder amplifier and a mark is produced on sheet 33 at the instantaneous area of intersection between the associated rotating and stationary electrodes.

Instead of forming the elliptical electrodes as disks, they may be formed as annular elliptical rings mounted between the spacers or in grooves in a cylindrical drum, or the electrodes may be formed as endless wire rings attached to a cylindrical drum.

What is claimed is:

1. A recorder for electrically marking a recording medium comprising a rotatable member, a substantially elliptical electrode mounted on said member, a linear electrode disposed to contact the elliptical electrode during rotation thereof with the recording medium therebetween, and means for supplying a recording current to said electrodes.

2. A recorder for electrically marking a recording medium comprising a rotatable member, a substantially elliptical electrode mounted on said member, a linear electrode disposed to contact the elliptical electrode during rotation thereof with the recording medium therebetween, means for supplying a recording current to said electrodes, a signal voltage source, and a reference voltage source, said sources being connected to said means, whereby a recording current is supplied to the electrodes when said signal voltage equals said reference voltage.

3. A multichannel recorder for electrically marking a recording medium comprising a conductive rotatable member, a plurality of substantially elliptical electrodes mounted on said member, a plurality of linear electrodes disposed to contact said elliptical electrodes with the recording medium therebetween, plural circuits for supplying recording currents to said electrodes, each of said circuits including said conductive member a plurality of signal voltage sources, and a plurality of reference voltage sources, said sources being connected to said plural circuits, whereby recording currents are supplied to the electrodes when said signal voltages equal said reference voltages.

4. A recorder for marking a recording medium comprising a plurality of linear electrodes and a plurality of rotatable substantially elliptical electrodes respectively disposed to contact said linear electrodes with the recording medium therebetween.

5. A recorder comprising a rotatable substantially elliptical electrode, a linear electrode disposed in contact with the rotatable electrode, and a recording medium disposed between said electrodes.

6. A multichannel recorder comprising a conductive rotatable member, a plurality of endless electrodes mounted on said member, a plurality of linear electrodes disposed in contact with said endless electrodes, and plural circuits for supplying recording currents to said endless and linear electrodes, each of said circuits including said conductive member.

7. A recorder according to claim 6, wherein said endless electrodes are substantially elliptical in form.

References Cited in the file of this patent

UNITED STATES PATENTS

| | | |
|---|---|---|
| 1,790,452 | Wilsey | Jan. 27, 1931 |
| 2,151,936 | Pflugner | Mar. 28, 1939 |
| 2,250,509 | Turner, Jr. | July 29, 1941 |
| 2,368,739 | Blain | Feb. 6, 1945 |
| 2,412,310 | Young | Dec. 10, 1946 |
| 2,505,779 | Long | May 2, 1950 |
| 2,527,599 | Terry | Oct. 31, 1950 |
| 2,560,247 | Rich | July 10, 1951 |